UNITED STATES PATENT OFFICE.

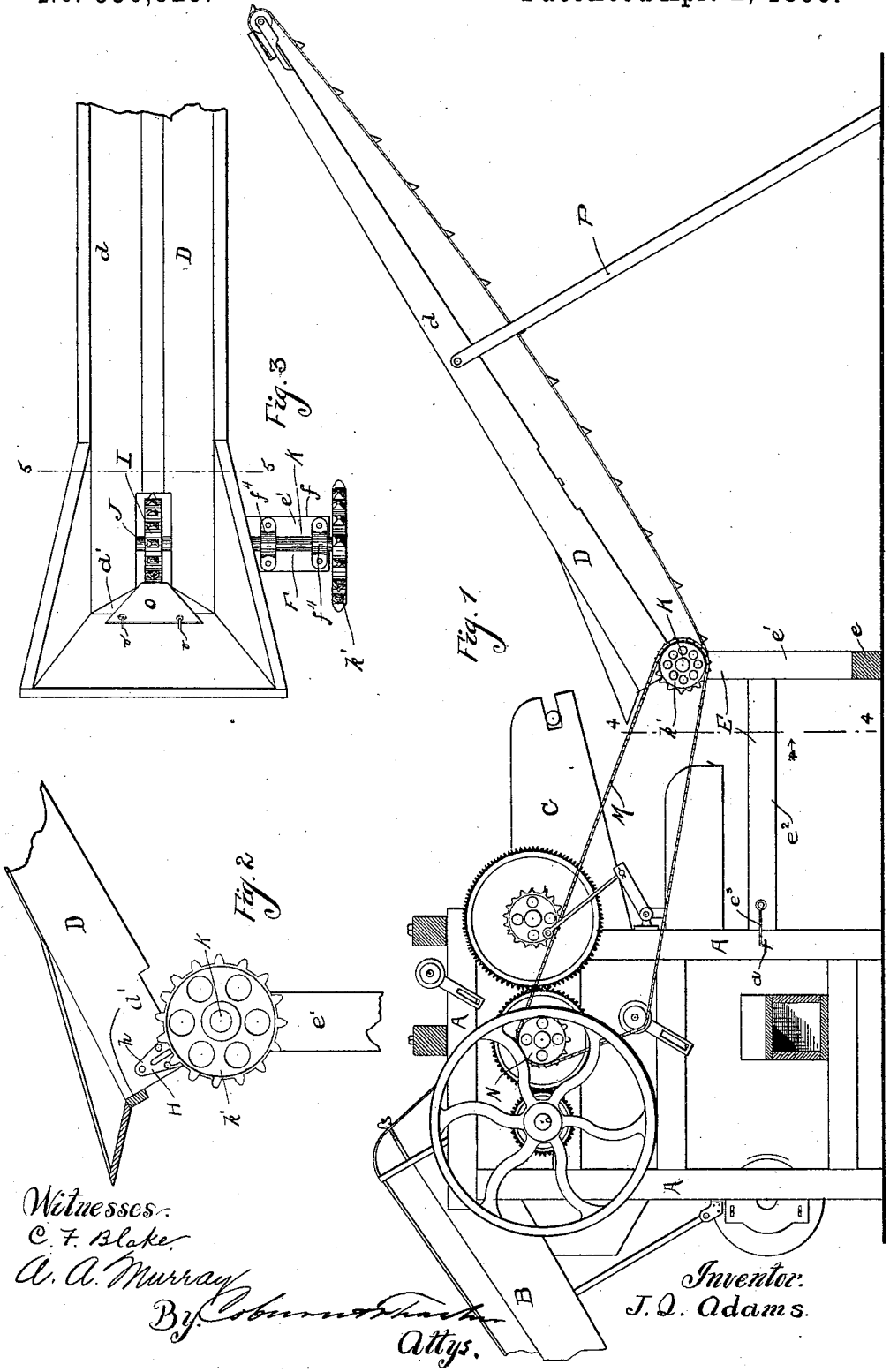

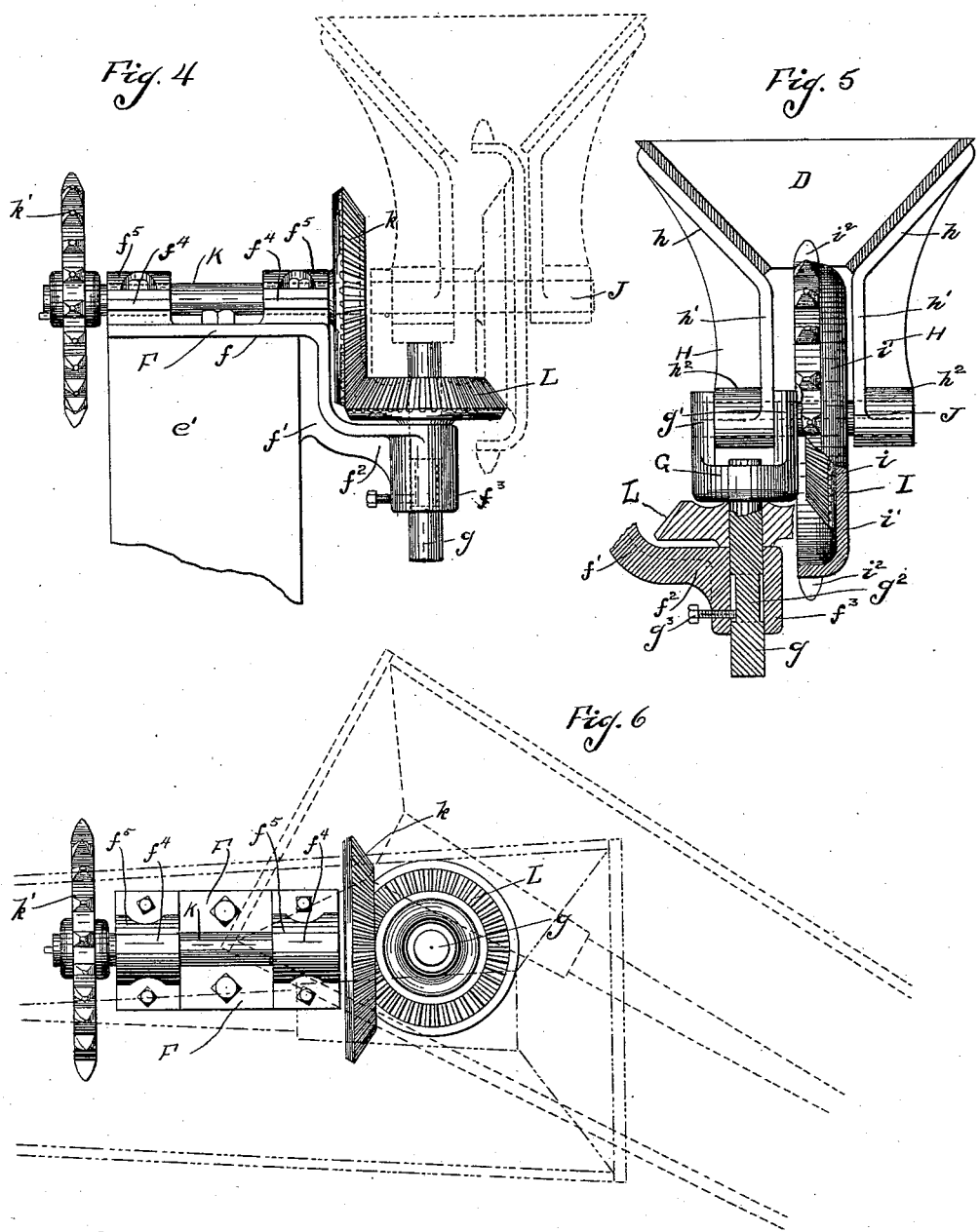

JOHN Q. ADAMS, OF MARSEILLES, ILLINOIS.

COB-STACKER.

SPECIFICATION forming part of Letters Patent No. 536,825, dated April 2, 1895.

Application filed September 19, 1894. Serial No. 523,473. (No model.)

*To all whom it may concern:*

Be it known that I, JOHN Q. ADAMS, a citizen of the United States, residing at Marseilles, in the county of La Salle and State of Illinois, have invented certain new and useful Improvements in Cob-Stackers for Corn-Shellers, which are fully set forth in the following specification, reference being had to the accompanying drawings, in which—

Figure 1 represents a side elevation of a corn sheller embodying my invention; Fig. 2, a detail side elevation at the lower end of the cob stacker, partly in section; Fig. 3, a detail plan of the lower end of the cob stacker; Fig. 4, a detail section on the line 4. 4 of Fig. 1, looking in the direction of the arrow thereon and partly in dotted lines; Fig. 5, a detail front elevation showing the mounting of the cob stacker, partly in section, and the trough in section on the line 5. 5 of Fig. 3, and Fig. 6, a plan view of the parts shown in Fig. 4 partly in dotted lines. In these drawings, Fig. 1 is upon a scale by itself; Figs. 2 and 3 are upon another and enlarged scale, and Figs. 4, 5, and 6 are upon a third scale, still further enlarged.

My invention relates to power corn shellers, a machine which is now in general use, and particularly to the cob stacker for such machines.

The invention consists in certain means for mounting the cob stacker independently of the rest of the machine and providing also for turning the said stacker in either direction laterally.

So much of a corn shelling machine as is necessary to an understanding of the construction and operation of my invention will now be fully described, and the particular improvements which I believe to be new and wish to secure by Letters Patent will be pointed out more definitely in claims.

In the drawings, A, represents the main or supporting frame of the machine; B, the feed elevator by which the ears of corn are brought up and delivered to the shelling mechanism, which is mounted within the main frame; and C, the usual separator frame at the rear of the main frame from which the cobs are discharged after the usual operation of shelling and separating.

The cob stacker, D, is mounted upon a support independent of the main frame but attachable thereto. This support is a kind of frame, E, consisting of a foot or ground beam, $e$, from about the middle of which rises an upright post, $e'$, and a horizontal bar, $e^2$, connected to the post, extends to the rear of the main frame, when this cob stacker support is stationed properly at the rear of the main frame and with the foot beam arranged transversely of the latter, as seen in Fig. 1. When thus located this cob stacker support is temporarily secured to the main frame by a hook or latch, $e^3$, adapted to hook into a staple, $a$, on the main frame. This cob stacker frame is, therefore, independent of the main frame, but may be temporarily connected thereto as required when the machine is in use.

A metal bracket, F, is mounted on the cob stacker frame, being secured to the top of the post, $e'$, by a flat seat, $f$. At one end of this seat there is a depending arm or bar, $f'$, dropping down at the side of the post a short distance, and then, turning directly outward, forming a horizontal arm, $f^2$, terminating in an enlargement, $f^3$, of circular form and perforated centrally to form a vertical bearing, as seen in Figs. 4 and 5. Upon the upper surface of this bracket seat are rising lugs, $f^4$, arranged at each end thereof and recessed suitably to form a part of the bearing for a shaft as will be hereinafter described.

A yoke, G, is mounted loosely on the end of a stem or pin, $g$, and the yoke arms, $g'$, rise from the central body of the yoke which is loose on the stem. The yoke pin, $g$, is adapted to fit the aperture in the tubular enlargement, $f^3$, of the bracket and is set into the latter, as seen in Figs. 4 and 5. This yoke pin is also cut away about midway of its length so as to provide a short section, $g^2$, within the bearing a little smaller than the main body of the stem. A binding screw, $g^3$, is inserted in a suitable threaded aperture in the said bearing and adapted to be set against this smaller section of the yoke pin to fix it in any position to which it may be adjusted, and this adjustment may be vertically within the limit of the cut therein.

The trough, $d$, of the cob stacker is V-shaped, an ordinary form of this device, and is slotted at the bottom in the usual way. The lower end of this trough is mounted upon two bracket arms, H, the upper ends, $h$, of which are inclined outward to fit the respective inclined sides of the trough which are fastened thereto, while the lower portions, $h'$, depend straight downward from the trough on each side of the slot therein and terminate in enlarged round heads, $h^2$, which are perforated centrally and horizontally so as to form bearings for a shaft, J, which is mounted in corresponding bearings in the arms of the yoke, so that these supporting brackets of the cob trough are mounted on the yoke by means of this shaft passing through the bearing apertures in all of them, the bearing end of one of the said bracket arms being arranged between the yoke arms, as seen in Fig. 5 and in dotted lines in Fig. 4.

When the yoke is mounted in the supporting bracket, F, as described above, obviously the cob stacker is mounted on and supported by the supplementary frame, E.

A compound gear and sprocket wheel, I, is mounted and fixed on the shaft, J, between the depending bracket arms and outside of the yoke arm arranged in the same space, as seen in Fig. 5. This is a known device consisting of a bevel gear, $i$, surrounded by a cup-shaped case, $i'$, on the rim of which is a series of sprockets, $i^2$, over which is run the carrier chain in the slot at the bottom of the trough which is driven by the rotation of the said wheel to carry the cobs up the trough and discharge them at the upper end thereof. This compound wheel is driven from a shaft, K, which is mounted in the bearing lugs, $f^4$, on the bracket, F, the bearing being completed by ordinary caps, $f^5$. At the inner end of this shaft there is fixed a bevel gear wheel, $k$, which is arranged to engage with a similar gear wheel, L, mounted loosely on pin, $g$, and engaging with the bevel gear section of the compound wheel, as seen in Figs. 4 and 6. A sprocket pinion, $k'$, is fixed to the outer end of the shaft, K, and a rotary movement is communicated to this shaft by means of a chain, M, running over the said pinion, and a similar pinion, N, on the main frame and suitably connected with the driving mechanism of the sheller to receive rotary movement therefrom, which is communicated by the chain to the shaft, K, and thence through the transmitting gear, L, to the cob chain driving wheel, I. This chain driving connection between the cob stacker and the sheller is not new, however; it is in common use. In mounting these parts the wheel, L, is first set in place upon the bracket with its central bearing aperture registering with the vertical opening in the bracket, in which position the inner edge of this wheel will, of course, set under the wheel, K, sufficiently far to engage therewith, as seen in Fig. 4. The pin, $g$, is then set up through the opening in the bracket and the bearing opening in the wheel, and if it is desired only to secure the latter in position, the set screw is turned in toward the reduced section, $g^2$, of the pin, but not tightly against it, when the upper shoulder of this section will drop and rest upon the inner end of the set screw, in which adjustment the upper end of the pin passes through the wheel and perhaps just a little above it. The stacker can then be mounted whenever desired by setting the yoke in proper position on the wheel and then setting the pin up through the bearing aperture in the yoke and until the lower shoulder of the reduced section, $g^2$, strikes against the set screw, when the latter is turned in sharply against this portion of the pin, thereby fixing it firmly in this position, in which all the parts are operatively mounted, as seen in Figs. 4 and 6.

Both the yoke and the wheel, L, have a loose bearing on the pin, $g$. The wheel rests upon the bracket and the yoke upon the wheel, while each may be turned individually on the said pin.

If it is desired to separate the stacker from the machine, it is only necessary to loosen the set screw, $g^3$, and permit the pin, $g$, to drop until the upper shoulder rests again on the pin as described above. In this position the upper end of the pin will be almost or quite drawn from the yoke which may then be easily slipped off sidewise from the wheel, carrying with it the parts mounted thereon. Obviously, however, the wheel will still remain in position for the pin is not withdrawn from its bearing. It is a point of this construction, however, to provide for the separation of the stacker from the machine without disturbing or removing any of the other parts, and obviously this result is effected as described above.

It will be seen from Figs. 4 and 5 that when the stacker is mounted in working position the cup rim of the compound wheel, I, incloses a portion of the wheel, L. Obviously then the yoke cannot be removed from its journal pin without first removing the wheel, I, for if the lifting of the yoke from the pin should be attempted the flange of the wheel, I, would come in contact with the under side of the wheel, L, and stop the removal; but with this invention the stacker is quickly and easily separated from the machine without disturbing any of its parts. It will also be seen from Fig. 4 that the wheel, L, cannot be lifted from the end of its journal pin without removing the wheel, $k$, which obviously will hold the wheel, L, down in position and the latter can be removed without disturbing other parts only by withdrawing the screw, $g^3$, until the pin, $g$, is free to slip down and entirely clear the wheel, which, of course, may then be slipped off sidewise from its seat.

It will be seen from the above description and from Fig. 1 of the drawings, that the cob stacker has no regular connection whatever with the sheller, and that it is entirely distinct from the separator out of which the cobs are discharged; but it must be so arranged that the cobs as discharged from the separator will drop into the lower end of the trough, as indicated in Fig. 1, when they will be taken by the carrier chain and carried up the stacker and discharged at the upper end as usual.

It will also be seen that the cob stacker is readily removable from the sheller by simply unhooking the connecting clasp hooks, $e^3$, on the cob stacker support, E.

The carrier wheel, I, is located at the lower end of the slot in the stacker trough, as seen in Figs. 2 and 3, and in order to accommodate this wheel, an opening is cut in the lower end piece, $d'$, of the trough. In order to prevent cobs from falling back through this opening and at the same time permit the required rotation of the wheel, a triangular shaped flap, O, is provided, which is hinged at its upper edge to the end of the trough by any suitable joint connections, $o$. The other end of the flap is free and hangs down into the trough just over the wheel and almost in contact with the sprockets thereon. This flap covers the opening in the end of the trough, and so prevents the cobs from dropping back through the latter. At the same time the wheel will not be stopped by any obstruction, for if anything is brought up against the back of the flap it yields on its hinges to permit the free passage thereof and so no harm can be done.

Obviously from the description above the cob stacker may be swung sidewise in either direction by simply lifting the brace bars or other outer support of the trough, when the latter is free to turn with the yoke, thereby permitting the swinging of the stacker into any position of adjustment required, as indicated by the full and dotted lines in Fig. 6, the stacker being secured in any position to which it may be adjusted simply by setting the trough brace bars again.

In the description above I have stated that the stacker is mounted upon a frame which is independent of the main frame, but temporarily connected therewith in operation, and this is the construction shown in the drawings. I do not wish to be understood as making this an essential feature of the present invention. It is merely an arrangement for a particular type of machine shown in the drawings; but the stacker may be mounted on the main frame, and this would be the preferred arrangement if the sheller is what is known as a mounted sheller. The cob stacker gearing would then be adapted to any suitable part of the mounting frame of the sheller and remain attached, the conveyer part of said stacker being taken off when desired to move, by dropping the pin down so as to allow the yoke to be detached as described above.

The cob stacker is provided with a suitable support of any kind. In the drawings a brace bar, P, is shown for this purpose hinged at one end to the stacker trough while the other rests on the ground when adjusted for the purpose of support,—an ordinary device.

Having thus described my invention, what I claim to be new, and desire to secure by Letters Patent, is—

1. In a corn sheller, a cob stacker support outside the sheller frame, in combination with a bracket, F, provided with a flat seat, $f$, by which it is secured to said support and a projecting bearing arm extending downward and outward from one end of the bracket and having at its extremity a tubular head, $f^3$, a yoke, G, journaled on stem, $g$, mounted in said bearing head, a bevel gear, L, mounted loosely on said stem between the yoke and bearing head, the journal shaft, J, mounted in the arms of the yoke, a cob trough, $d$, bracket arms, H, secured to the lower end of said trough depending therefrom and journaled on the shaft, J, a compound wheel, I, consisting of a sprocket rim case, $i'$, and a bevel gear, $i$, mounted tightly on the shaft, J, between the brackets and with the bevel gear engaging with the wheel, L, a shaft, K, mounted in journal bearings on the bracket seat, $f$, and carrying at one end a bevel gear, $k$, engaging with the wheel, L, and at its other end a sprocket pinion, $k'$, and a chain running over said pinion, $k'$, and a suitable driving pinion connected with the driving mechanism of the sheller, substantially as described.

2. In a corn sheller, a supporting bracket, F, provided with a vertical journal bearing, in combination with a journal pin of greater length than said bearing, fitting loosely therein, and constructed with a reduced or cut away section extending lengthwise of the pin toward its lower end, a binding screw mounted in the bracket and adapted to be set into the reduced section of the pin for securing it at different points of adjustment, a transmitting wheel set and resting upon the surface of said bracket and having a journal bearing or aperture into which the upper end of the pin, when adjusted upward, will pass loosely to provide a journal for said wheel and hold it from slipping from the bracket, substantially as described.

3. In a corn sheller, a supporting bracket, F, provided with a vertical journal bearing, in combination with a journal pin of greater length than said bearing, fitting loosely therein, and constructed with a reduced or cut away section running lengthwise of the pin and preferably nearer the lower end thereof, a binding screw mounted in the bracket and adapted to be set into the said cut in the pin for fixing the latter at different points of adjustment, a transmitting wheel set on said bracket and provided with a journal bearing, and a supporting or bearing yoke set on said wheel and having a like journal bearing, all these parts constructed and arranged so that, at its highest point of adjustment, the said pin will pass up through the said bearings in the wheel and yoke, and, at its lowest adjustment, will drop out entirely from the yoke and either wholly or nearly so from the wheel, substantially as described.

4. In a corn sheller, a fixed bracket, F, provided with a vertical aperture or journal bearing, in combination with a journal pin, g, set adjustably in said bearing, a transmitting wheel mounted loosely on the upper end of said journal pin above the bracket on which it rests, a yoke, G, also mounted loosely on the upper end of said pin above the transmitting wheel, the transmitting wheel and yoke being detachable from the pin by simply slipping off the end thereof, and a combination drive wheel, constructed with a gear section adapted to engage with the said gear on the pin and a sprocket section adapted to engage with the cob elevator chain, substantially as described.

5. In a corn sheller, a journal pin mounted in a fixed support and adjustable vertically therein, in combination with a yoke journaled loosely on the upper end of said pin above its support, a horizontal shaft mounted in the arms of said yoke and projecting at one end some distance outside its bearing, a stacker trough provided with arms at its lower end by means of which it is journaled on the horizontal shaft, one arm having its bearing between the arms of the yoke and the other on the extreme outer end of said shaft, a combination drive wheel, having a bevel gear section and a sprocket section for the cob chain and fixed on the horizontal shaft between the yoke and the trough arm at the outer end of said shaft, and a horizontal bevel gear mounted loosely on the adjustable pin below the yoke and between it and the pin support, substantially as described.

JOHN Q. ADAMS.

Witnesses:
A. T. ADAMS,
G. J. CRAM.